United States Patent [19]
Nishio et al.

[11] Patent Number: 4,723,278
[45] Date of Patent: Feb. 2, 1988

[54] VOICE CIRCUIT OF TELEPHONE

[75] Inventors: Koji Nishio; Yasuo Shirai, both of Tokyo, Japan

[73] Assignee: Kabushiki Kaisha Toshiba, Kawasaki, Japan

[21] Appl. No.: 898,227

[22] Filed: Aug. 20, 1986

[30] Foreign Application Priority Data

Aug. 21, 1985 [JP] Japan .................. 60-183662

[51] Int. Cl.$^4$ .................. H04M 1/76; H04M 1/60
[52] U.S. Cl. .................. 379/394; 379/395
[58] Field of Search .................. 379/387, 391–392, 379/394, 395, 398

[56] References Cited

U.S. PATENT DOCUMENTS

| | | | |
|---|---|---|---|
| 3,742,152 | 6/1973 | Matsuda et al. | 379/395 |
| 3,789,155 | 1/1974 | Fensom | 379/394 |
| 4,071,713 | 1/1978 | Sencer | 379/391 |
| 4,394,542 | 7/1983 | Hara et al. | 379/394 |
| 4,680,789 | 7/1987 | Sijbers et al. | 379/395 |

OTHER PUBLICATIONS

Horowitz and Hill, The Art of Electronics, Sec 2.04-Emitter Followers as Voltage Regulators, p. 56.

Primary Examiner—Thomas W. Brown
Assistant Examiner—Mark E. Ham
Attorney, Agent, or Firm—Finnegan, Henderson Farabow, Garrett & Dunner

[57] ABSTRACT

A voice circuit of a telephone is provided with a differential amplifier and an impedance setting circuit. An output of an amplifier to amplify an output signal of a transmitter is supplied to the inverting input terminal of the differential amplifier. An output of the impedance setting circuit is supplied to the noninverting input terminal of the differential amplifier. An output signal of the differential amplifier is supplied to a line driver. A positive feedback loop is constituted by the differential amplifier, line driver, telephone line, and impedance setting circuit. By controlling a feedback amount in this positive feedback loop, an AC impedance is controlled.

3 Claims, 3 Drawing Figures

VOICE CIRCUIT OF TELEPHONE

BACKGROUND OF THE INVENTION

The present invention relates to a voice circuit of an electronic telephone.

Recently, electronic telephones have been put into practical use in place of telephones in which a channel is formed by a transformer. A voice circuit of such an electronic telephone is constituted as shown in, e.g., FIG. 1. Namely, a voice signal input from a transmitter 11 is amplified by an amplifier 12 and then supplied to a line driver 13. Line driver 13 controls a take-in amount of a DC bias current flowing between a pair of telephone lines 14a and 14b in accordance with a level of the voice signal input from transmitter 11, thereby transmitting a signal corresponding to the voice signal input from transmitter 11 onto telephone lines 14a and 14b. Signals which are transmitted through telephone lines 14a and 14b are amplified by an amplifier 15 and thereafter they are supplied to a receiver 16 and output as a voice signal therefrom.

In the voice circuit of such an electronic telephone, the operating power source voltages of amplifiers 12 and 15 and the like are produced from the currents flowing through telephone lines 14a and 14b by use of a regulating power supply circuit 17. Power supply circuit 17 is constituted by, for example, connecting a resistor 18 and a capacitor 19 in series between telephone lines 14a and 14b. The voltage having a value corresponding to the voltage drop due to resistor 18 is subtracted from the DC voltage between telephone lines 14a and 14b and supplied as operating power source voltage to amplifiers 12 and 15.

In such a voice circuit, an amplifier, for example, amplifier 15, when used to drive receiver 16, consumes a large amount of current. In this case, regulating power supply circuit 17 needs to supply a high voltage and a large current. For this purpose, the resistance of resistor 18 needs to be set at a low value.

An AC impedance with respect to telephone lines 14a and 14b has a value which is almost equal to an impedance of resistor 18. Therefore, if the resistance value of resistor 18 is reduced to enable regulating power supply circuit 17 to supply a high voltage and a large current as mentioned above, the AC impedance of the telephone will decrease. However, in general, the AC impedance of the telephone has a rated value. If the AC impedance is set to a low value as mentioned above, it will be hard to match the AC impedance of the telephone with this rated value. Moreover, in the case where the AC impedance of the telephone doesn't satisfy the rated value, there is a possibility that the capability of the system (exchanger) to transmit the reception signal deteriorates.

However, if the resistance value of resistor 18 is set to increase the AC impedance of the telephone end, at the same time, if it is set to realize the supply of a high voltage by regulating power supply circuit 17, then the DC impedance must be set to a high value. In such a situation, in the case where a conventional telephone is used, for example, one in which the channel is constituted by a transformer, and is connected in parallel with the same telephone lines 14a and 14b and made operative simultaneously with the electronic telephone, a sufficient operating power source voltage is not supplied to the electronic telephone due to the difference between the DC impedance values, resulting in unsatisfactory operation of the electronic telephone.

SUMMARY OF THE INVENTION

It is therefore an object of the present invention to provide a voice circuit of a telephone which can freely control an AC impedance to a telephone line.

Additional objects and advantages of the invention will be set forth in part in the description which follows, and in part will be obvious from the description, or may be learned by practice of the invention. The objects and advantages may be realized and attained by means of the instrumentalities and combinations particularly pointed out in the appended claims.

According to one embodiment of the invention, there is provided a voice circuit of a telephone comprising: a transmitter; a pair of telephone lines through which a DC bias current flows; a regulating power supply circuit, connected between those pair of telephone lines, for generating a predetermined voltage on the basis of the DC bias current flowing between the telephone lines; a first amplifier which is made operative by an output voltage of the regulating power supply circuit and amplifies an output of the transmitter; a differential amplifier having an inverting input terminal to which an output of the first amplifier is supplied, a noninverting input terminal, and an output terminal; an impedance setting circuit, connected between the pair of telephone lines, for supplying an output to the noninverting input terminal of the differential amplifier; a line driver, connected between the pair of telephone lines, for transmitting a signal onto the telephone lines in response to an output signal of the differential amplifier; a second amplifier which is made operative by the output voltage of the regulating power supply circuit and amplifies the signal which is transmitted through the telephone lines; and a receiver to which an output of the second amplifier is supplied, wherein a positive feedback loop is constituted by the differential amplifier, line driver, telephone line, and impedance setting circuit, and by controlling a feedback amount in the positive feedback loop, the AC impedance is set.

With such an arrangement, it is possible to provide a voice circuit of a telephone which can freely control the AC impedance for the telephone lines and can eliminate the above-mentioned inconveniences.

DETAILED DESCRIPTION OF THE PREFERRED EMBODIMENTS

Reference will now be made in detail to the present preferred embodiments of the invention, examples of which are illustrated in the accompanying drawings.

Figure 1:
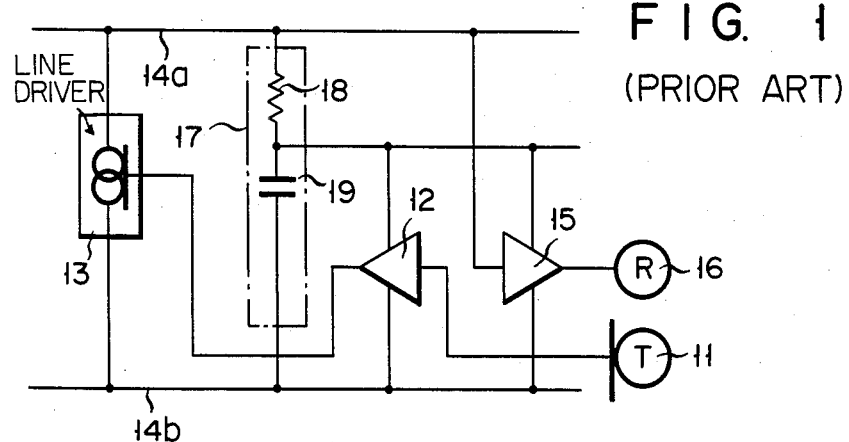
FIG. 1 is a circuit diagram showing a voice circuit of a conventional electronic telephone.
Figure 2:
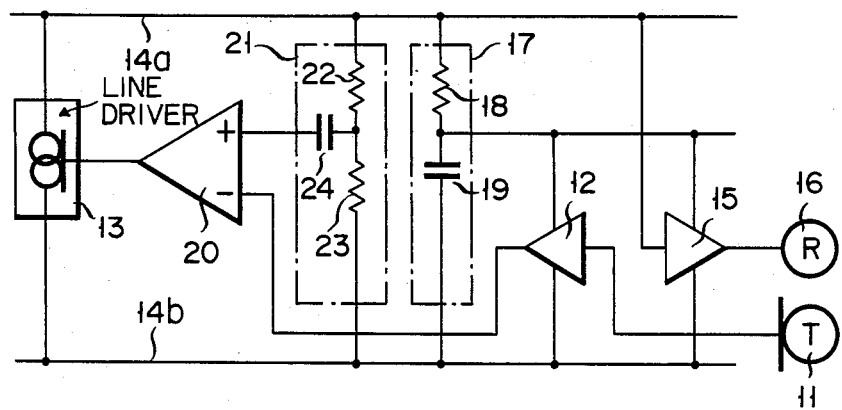
FIG. 2 is a circuit diagram showing a voice circuit of an electronic telephone according to an embodiment of the present invention.

In FIG. 2, the same parts and components as those shown in FIG. 1 are designated by the same reference numerals. A voice signal input from transmitter 11 is amplified by amplifier 12 and then supplied to an inverting input terminal (−) of a differential amplifier 20. An output signal of an impedance setting circuit 21 is supplied to a noninverting input terminal (+) of differential amplifier 20. Impedance setting circuit 21 comprises: resistors 22 and 23 connected in series between a pair of telephone lines 14a and 14b; and a capacitor 24, connected between a node of resistors 22 and 23 and noninverting input terminal (+) of differential amplifier 20, for removing the DC component. An output of differential amplifier 20 is supplied to line driver 13 connected between telephone lines 14a and 14b. Line driver 13 controls a take-in amount of a DC bias current flowing between a pair of telephone lines 14a and 14b in accordance with the level of the voice signal input from transmitter 11, thereby transmitting a signal corresponding to the voice signal input from transmitter 11 onto telephone lines 14a and 14b. On the other hand, signals which are transmitted through telephone lines 14a and 14b are amplified by amplifier 15 and thereafter they are supplied to receiver 16 and output as a voice signal therefrom. Amplifiers 12 and 15 are supplied with the operating power source voltages from regulating power supply circuit 17 consisting of resistor 18 and capacitor 19 in a manner similar to the case of FIG. 1.

The voice circuit shown in FIG. 2 differs from the conventional voice circuit shown in FIG. 1 with respect to the following point. Namely, line driver 13 is not directly driven by the output signal of amplifier 12 for amplifying the voice signal input from transmitter 11 but the output signal of amplifier 12 is supplied to inverting input terminal (−) of differential amplifier 20 and line driver 13 is driven by the output signal of differential amplifier 20. As mentioned above, the output signal of impedance setting circuit 21 is supplied to noninverting input terminal (+) of differential amplifier 20. A positive feedback loop is constituted by impedance setting circuit 21, differential amplifier 20, line driver 13, and telephone line 14a. In this case, an amount of positive feedback is determined by a ratio of resistance values of resistors 22 and 23. The AC signal component transmitted to telephone lines 14a and 14b through line driver 13 is divided in accordance with the resistance value ratio of resistors 22 and 23 and supplied to noninverting input terminal (+) of differential amplifier 20.

In the circuit described above, it is now assumed that the resistance value of resistor 18 is set to a low value to enable regulating power supply circuit 17 to supply a high voltage and a large current. It is also assumed that the resistance value ratio of resistors 22 and 23 is preset in impedance setting circuit 21 so as to obtain a predetermined AC impedance between telephone lines 14a and 14b.

When the voice signal is input from transmitter 11 and supplied to amplifier 12, the amplified signal of the voice signal amplified by amplifier 12 is supplied to differential amplifier 20, by which line driver 13 is driven. Thus, the signal at a predetermined level is sent to telephone lines 14a and 14b. A part of the signal component transmitted is fed to telephone lines 14a and 14b through a positive feedback loop consisting of telephone line 14a, impedance setting circuit 21, differential amplifier 20, and line driver 13. Due to this, the signal component transmitted onto telephone lines 14a and 14b is controlled to a desired level. Therefore, a virtual AC impedance with regard to telephone lines 14a and 14b can be set to a predetermined value corresponding to the resistance value ratio of resistors 22 and 23 (for example, within a range of 600Ω±200Ω as a rated value of such a kind of apparatus) irrespective of the resistance value of resistor 18. Thus, even if the resistance value of resistor 18 is set to a low value to enable regulating power supply circuit 17 to supply a high voltage and a large current, the deterioration of the capability of the exchanger as in the conventional voice circuit will not occur.

Further, in the case where conventional telephones in which the channel is constituted by the transformer are connected in parallel with the same telephone line and made operative simultaneously with the telephone equipped with a voice circuit by setting a DC impedance so as to be equal to the DC impedance of the telephone in which the channel is constituted by the transformer, a situation where the electronic telephone doesn't satisfactorily operate will not occur. However, in the case where a load such as a dialer or the like is connected to telephone lines 14a and 14b as well, the reduction in the AC impedance can be prevented by presetting the resistance value ratio of resistors 22 and 23 of impedance setting circuit 21.

Figure 3:
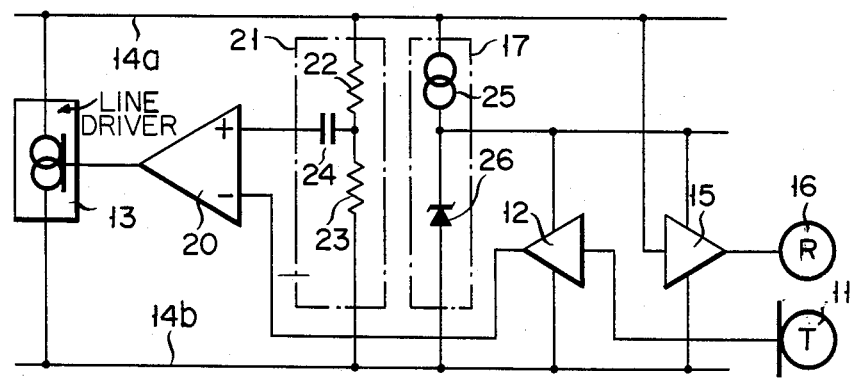
FIG. 3 is a circuit diagram showing a voice circuit of an electronic telephone according to another embodiment of the invention.

FIG. 3 shows another embodiment of the present invention. In FIG. 3, the same parts and components as those shown in FIG. 2 are designated by the same reference numerals and their detailed descriptions are omitted. The case where regulating power supply circuit 17 is composed of resistor 18 and capacitor 19 has been described in the foregoing embodiment. In FIG. 3, regulating power supply circuit 17 is comprised of a current source 25 and a constant voltage diode 26. With this arrangement, the same operation as that in the foregoing embodiment can also be performed and the same effect can also be derived. It will be apparent to those skilled in the art that regulating power supply circuit 17 is not limited to the circuit arrangement of the embodiments mentioned above but various modifications and variations may also be used without departing from the scope or spirit of the invention The case where the virtual AC impedance of the telephone is set to be higher than the actual value has been described in each of the foregoing embodiments. However, in FIGS. 2 and 3, if the output signal of amplifier 12 is supplied to noninverting input terminal (+) of differential amplifier 20 and the output of impedance setting circuit 21 is supplied to inverting input terminal (−) of differential amplifier 20, a negative feedback loop can be constituted by impedance setting circuit 21, differential amplifier 20, line driver 13, and telephone line 14a, so that the virtual AC impedance can be set to be lower than the actual value. With this arrangement, the muting function can be also added to the telephone. Namely, by providing a switch to reverse the connecting state of inverting input terminal (−) and noninverting input terminal (+) of differential amplifier 20 and setting the AC impedance to a low value as necessary due to the control of this switch, the voice signal input from transmitter 11 is not transmitted onto telephone lines 14a and 14b, so that the muting function can be obtained.

In each of the embodiments, impedance setting circuit 21 has been used to control the positive feedback amount and negative feedback amount. However, the feedback amount can also be controlled by directly supplying the signal of telephone line 14a to noninverting input terminal (+) or inverting input terminal (−) of differential amplifier 20 and by controlling the gain of differential amplifier 20.

What is claimed is:
1. A voice circuit of a telephone comprising:

a transmitter;

a pair of telephone lines through which a DC bias current flows;

a regulating power supply circuit, connected between said pair of telephone lines, for generating a predetermined voltage on the basis of the DC bias current flowing between said telephone lines;

a first amplifier which is made operative by the output voltage of said regulating power supply circuit and amplifies an output of said transmitter;

a differential amplifier having an inverting input terminal to which an output of said first amplifier is supplied, an noninverting input terminal, and an output terminal;

a line driver, connected between said pair of telephone lines, for transmitting a first signal onto said telephone lines in response to an output signal of the differential amplifier, said first signal being divided into a plurality of components;

an impedance setting circuit, connected between said pair of telephone lines, for supplying an output to the noninverting input terminal of said differential amplifier and for feeding back part of said signal components through a positive feedback loop, said feedback loop including one of said telephone lines, said impedance setting circuit, said differential amplifier and said line driver, and wherein said impedance setting circuit adjusts the level of the signal components transmitted to said telephone lines;

said impedance setting circuit consists of first and second resistors which are connected in series between said pair of telephone lines and a capacitor which is connected between a node of said first and second resistors and the noninverting input terminal of said differential amplifier;

a second amplifier which is made operative by the output voltage of the regulating power supply circuit and amplifies a second signal, other than said first signal, which is received from the telephone lines; and a receiver to which an output of said second amplifier is supplied.

2. A voice circuit according to claim 1, wherein said regulating power supply circuit consists of a resistor and a capacitor which are connected in series between said pair of telephone lines, and an output voltage is obtained from a node of said resistor and said capacitor.

3. A voice circuit according to claim 1, wherein said regulating power supply circuit consists of a current source and a constant voltage diode which are connected in series between said pair of telephone lines, and an output voltage is obtained from a node of said current source and said constant voltage diode.

* * * * *